June 18, 1940.  H. E. SCHULTZ  2,205,179
PHOTOGRAPHIC FILTER MAGAZINE
Filed Feb. 23, 1938

Inventor,
H. E. SCHULTZ.
By Shirling P. Buck,
Attorney.

Patented June 18, 1940

2,205,179

UNITED STATES PATENT OFFICE 2,205,179

PHOTOGRAPHIC FILTER MAGAZINE

Harold E. Schultz, Niagara Falls, N. Y.

Application February 23, 1938, Serial No. 191,991

5 Claims. (Cl. 88—113)

This invention relates to a photographic filter magazine.

One object of the invention is to provide a very simple and practical device for holding a plurality of light-filtering units of various light-filtering capabilities in such interchangeable relation that they can be brought interchangeably before the lens-holder of a camera while they remain in the holding device or magazine.

Another object is to provide for interchanging the filtering-units, with respect to the lens-holder, in the minimum of time and the maximum of convenience and accuracy.

Another object is to provide, in a filter magazine, a practical and effective means of protecting the filtering units from contact with the hands of the user and from other things that would tend to impair their respective capabilities.

Another object is to provide, in a filtering magazine, a very simple, effective and accurate means for yieldingly securing the magazine-disc in its different adjustments so as to hold said filtering units, respectively in proper registration with the light-openings that register with the camera's lens-holder.

Another object is to provide, in a filter magazine, a simple and effective means for preventing glare on the filter-unit that is in the operative position.

Other objects and important features are pointed out or implied in the following details of description, in connection with the accompanying drawing in which.

Referring to this drawing in detail, in which, similar reference characters refer to similar parts in the several views, the invention is described in detail as follows.

Figure 1:
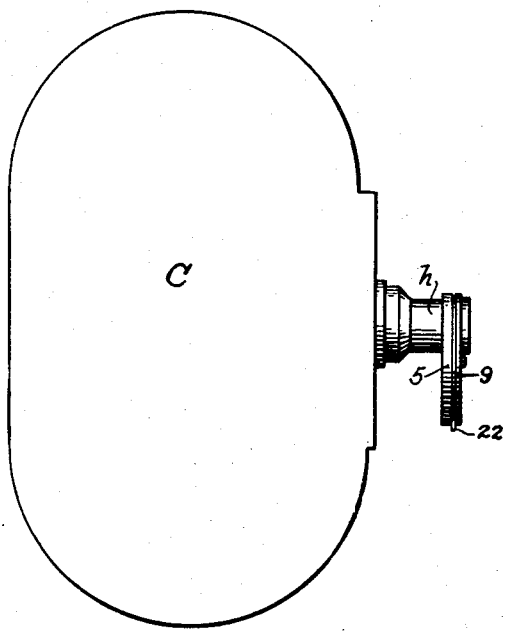
Fig. 1 is a side elevation of a conventional form of camera having my filter magazine attached in the operative position.
Figure 2:
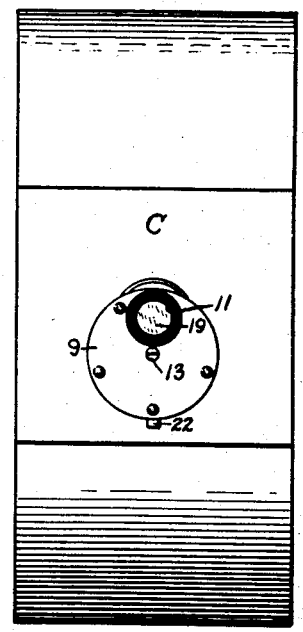
Fig. 2 is a front elevation of the device shown in Fig. 1.
Figure 3:
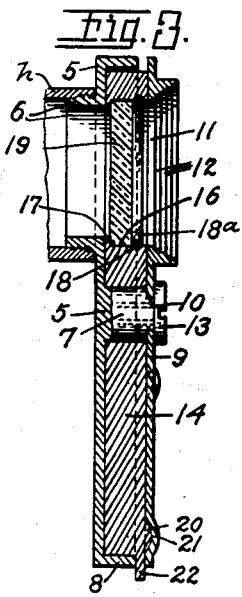
Fig. 3 is a central vertical sectional view, considerably enlarged, of the filter magazine and of a fragment of lens holder to which it is secured.
Figure 4:
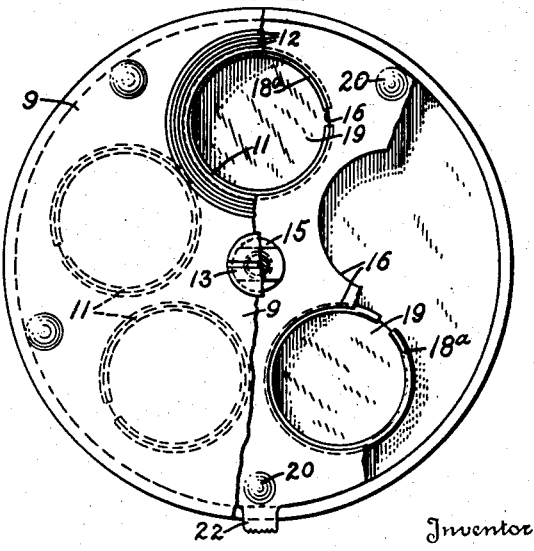
Fig. 4 is a front view of the filter magazine having parts of the cover-plate, its securing screw, and the magazine-disc broken off to more clearly show the construction of the basal member and its relation to the other members.

The camera is indicated at C, and its lens-holder at $h$, the latter having internal screw-threads that engage with the externally screw-threaded wall of a basal member or plate 5 whose wall 6 surrounds a light-opening which is normally in registration with the lens-holder's light-inlet. On the opposite side of said plate from said wall 6, an axial stud 7 is formed, and an annular marginal wall 8 constitutes the peripheral part of the plate or basal member. The stud 7 extends beyond the plane of the top of said annular wall and has a slabbed outer end which is centrally bored and internally screw-threaded.

A cover-plate 9 has a central opening 10 that fits snugly on the slabbed end portion of the stud 7 so as to be held thereby in narrowly spaced relation to said annular wall and in a wider spaced relation to the main part of the member 5, viz., that part which surrounds said stud and is surrounded by said annular wall. The cover-plate has a light-opening 11 whose inner surface is formed of a set of small annular grooves and ridges 12 that serve to prevent glare of light therethrough. This latter light-opening is in registration with the light-opening of said basal member. A screw 13 is engaged with the internal threads of the stud 7 and cooperates therewith for removably securing the cover-plate in its normal position, but permitting it to be removed for obtaining more convenient access to the parts that will presently be described.

A magazine-disc 14 has a central opening 15 and a set of eccentric openings 16, the latter being arranged in an annular series or equi-distant from the disc's axis. This magazine-disc is loosely or movably fitted between the main portions of the basal member and the cover-plate, and while its central opening fits around said stud, or is journaled thereon, it also fits against the annular peripheral wall 8 and is substantially journalled therein; so that, if either the stud or the wall were omitted, the magazine disc would still be rotatably mounted between the members 5 and 9 in the same definite relation where its openings 16 are respectively and interchangeably movable into registration with the light-openings of the members 5 and 9. Each eccentric opening is preferably provided with an annular shoulder 17 and an annular groove 18 between which is seated a transparent light-filtering unit or disc 19, viz., one of a set of light-filtering units of different light-filtering capabilities for interchangeable use according to atmospheric and other conditions that effect the transmission of light. An annular wire-spring 18a is fitted in each groove 18 for engagement with the adjacent periphery of a filtering unit to prevent accidental displacement thereof while permitting it to be removed for replacement when desirable.

One or more convex bosses 20 are united with the magazine-disc for engaging with concavities 21 in the cover-plate so as to cooperate therewith for detaining the magazine disc in its several effective positions in which one or another of the filter-units is in registry with the light-openings. It is evident that all but one of either of the parts 20 and 21 may be omitted, and that the concavities and bosses may be reversed, or that other detaining means may be substituted therefor without sacrificing the important function of yieldingly securing the magazine in a number of desirable adjustments, and of permitting the disc to be turned by a pressure sufficient to overcome the spring-action of the cover-plate as the bosses slide out of the respective cavities. A manipulative element 22 is united with the periphery of the disc 14 and extends through the marginal annular space between the members 5 and 9 and is movable therearound by proper manipulation so as to effect the different adjustments of the magazine-disc and its filtering units.

From the foregoing, it is evident that the invention is not limited to the precise details of construction and arrangement disclosed in the drawing or specification; but the invention is susceptible of numerous changes within the scope of the inventive ideas as implied and claimed.

What I claim as my invention is:

1. In a photographic filter magazine, as an attachment for a camera, the combination of a basal member having a light-opening therethrough and provided with means around said light-opening to removably secure it directly on the lens-holder of a camera in such position that said light-opening is in front of said lens-holder, a plate secured on said basal member and having a light-opening in registration with the light-opening of said basal member, a magazine-disc rotatably mounted between said basal member and said plate and having a set of eccentric openings adapted to be moved respectively into registration with said light-openings by rotary movements of said disc, and a plurality of light-filtering units of different light-filtering capabilities seated respectively in a number of said eccentric openings so as to be moved selectively between said light-openings by rotary movements of said disc.

2. In a photographic filter magazine, the combination of a basal member having a light-opening therethrough and provided with means to removably secure it directly on the lens-holder of a camera in such position that said light-opening is in front of said lens-holder, a plate secured on said basal member and having light-openings in registration with the light opening of said basal member, a magazine-disc rotatably mounted between said basal member and said plate and having a set of eccentric openings adapted to be moved respectively into registration with said light-openings by rotary movements of said disc, and a plurality of light-filtering units of different light-filtering capabilities seated respectively in a number of said eccentric openings so as to be moved selectively between said light-openings by rotary movements of said disc, said basal member having an annular wall around the periphery of said magazine-disc and spaced from substantially all parts of the margin of said plate, said disc having a manipulative element projecting through the space between said annular wall and plate and adapted to be moved substantially therearound for disposing the respective filtering units between said light-openings.

3. The combination defined by claim 1, said basal member being provided with a central stud which extends through a central opening in said magazine disc and is secured to said plate so as to secure said plate in a fixed and spaced position with respect to said basal member's marginal portion, said central stud being the journal on which said magazine-disc is rotatably mounted.

4. In a photographic filtering magazine, as an attachment for a camera, the combination of a circular basal member having an eccentrically located light-opening therethrough and provided with means around said light-opening to removably attach it directly on the lens-holder of a camera in such position that said light-opening is substantially in front of said lens-holder, a plate secured on said basal member and having a light-opening in registration with the light-opening of said basal member, a magazine-disc between said basal member and said plate and rotatable about the center of said circular basal member and having a set of eccentric openings respectively in a proper position to be brought into registration with said light-openings by rotation of said magazine-disc, and a plurality of light-filtering units of different light-filtering capabilities seated respectively in a number of said eccentric openings so as to be movable selectively into registration with said eccentrically located light openings by rotary movements of said magazine-disc.

5. The combination defined by claim 1, said plate being of springy material and having its central portion rigidly united with an element of said basal member while its marginal portion is free to be moved against its spring-action, said plate and magazine-disc being provided with complemental bosses and cavities normally engaged by said spring action and cooperating to hold a respective one of said light-filtering units in registration with said light-openings, and said magazine-disc being provided with a manipulative element by which said bosses and cavities can be disengaged and by which said magazine can be moved for bringing another of said light-filtering units into registration with said light-openings.

HAROLD E. SCHULTZ.